(12) United States Patent
Sato

(10) Patent No.: US 9,335,613 B2
(45) Date of Patent: May 10, 2016

(54) PROJECTOR HAVING AN ADJUSTER TO ADJUST AN ANGLE OF A PROJECTOR LENS

(71) Applicant: SEIKO EPSON CORPORATION, Tokyo (JP)

(72) Inventor: Noriyuki Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 14/326,734

(22) Filed: Jul. 9, 2014

(65) Prior Publication Data

US 2015/0022789 A1    Jan. 22, 2015

(30) Foreign Application Priority Data

Jul. 18, 2013    (JP) ................. 2013-149173

(51) Int. Cl.
| | |
|---|---|
| *G03B 21/14* | (2006.01) |
| *G03B 21/20* | (2006.01) |
| *G03B 21/00* | (2006.01) |
| *G03B 21/28* | (2006.01) |

(52) U.S. Cl.
CPC ............ *G03B 21/142* (2013.01); *G03B 21/006* (2013.01); *G03B 21/145* (2013.01); *G03B 21/2066* (2013.01); *G03B 21/28* (2013.01)

(58) Field of Classification Search
CPC ........ G03B 21/10; G03B 21/14; G03B 21/22; G03B 21/30; G03B 21/145; G03B 21/2066; G03B 21/006; G03B 21/142
See application file for complete search history.

(56) References Cited

U.S. PATENT DOCUMENTS

| | | | | |
|---|---|---|---|---|
| 5,317,436 A | * | 5/1994 | Spitzer .................. | A61B 3/113 257/E27.111 |
| 5,986,806 A | | 11/1999 | Sugawara | |
| 2005/0036120 A1 | | 2/2005 | Hirata et al. | |
| 2006/0176579 A1 | | 8/2006 | Kuwa | |
| 2007/0291236 A1 | | 12/2007 | Hirata et al. | |
| 2010/0265470 A1 | | 10/2010 | Hirata et al. | |
| 2010/0265471 A1 | | 10/2010 | Hirata et al. | |
| 2010/0265474 A1 | | 10/2010 | Hirata et al. | |
| 2011/0063586 A1 | * | 3/2011 | Amano ............... | H04N 9/3197 353/99 |
| 2011/0075113 A1 | | 3/2011 | Hirata et al. | |
| 2011/0188008 A1 | * | 8/2011 | Maeda .................. | G03B 21/14 353/85 |
| 2011/0267588 A1 | * | 11/2011 | Dai ....................... | G03B 21/54 353/98 |
| 2011/0299047 A1 | | 12/2011 | Hirata et al. | |
| 2012/0008960 A1 | * | 1/2012 | Kubo .................. | G03B 21/145 398/106 |
| 2012/0099087 A1 | * | 4/2012 | Sakuma .............. | G03B 21/145 353/119 |
| 2012/0229777 A1 | | 9/2012 | Hirata et al. | |

FOREIGN PATENT DOCUMENTS

| | | |
|---|---|---|
| CN | 101539715 A | 9/2009 |
| JP | A-62-250406 | 10/1987 |
| JP | A-10-133101 | 5/1998 |
| JP | A-2000-81601 | 3/2000 |
| JP | A-2005-62222 | 3/2005 |
| JP | A-2005-301074 | 10/2005 |

* cited by examiner

*Primary Examiner* — Sultan Chowdhury
(74) *Attorney, Agent, or Firm* — Oliff PLC

(57) ABSTRACT

A projector includes a projection lens (reflective projection lens) that has a reflective optical element (reflective lens) and reflects and projects a modulated light flux, an optical unit formed of optical elements disposed downstream of a light source apparatus and upstream of the reflective projection lens, a support that supports the reflective projection lens in an detachable manner with the optical unit, and an angle adjuster that adjusts a setting angle of the reflective projection lens.

4 Claims, 7 Drawing Sheets

PROJECTOR HAVING AN ADJUSTER TO ADJUST AN ANGLE OF A PROJECTOR LENS

BACKGROUND

1. Technical Field

The present invention relates to a projector.

2. Related Art

There is a known projector of related art that modulates a light flux outputted from a light source apparatus in accordance with image information and projects the modulated light flux through a projection lens. Further, there is a projector in which a projection lens including a reflective optical element reflects and projects such a modulated light flux on a screen or any other surface.

JP-A-10-133101 discloses a projection apparatus that performs projection with the exiting angle of light that exits out of a projection optical system inclined to a base surface to correct distortion, trapezoidal distortion, image plane inclination, and other defects of projected video images. JP-A-2005-301074 discloses an optical system for correcting video images by using inclination created by a mirror, which is a reflective optical element.

FIG. 7 is a diagrammatic view showing a case where a projector 900, to which a reflective projection lens 910 of related art is attached, is used to project an image on a screen SC.

When the reflective projection lens 910 including a reflective optical element 911 is used to project an image on the screen SC, the projected image typically tends to have an image plane C that is curved (field curvature) or does not coincide with a flat surface A of the screen C, as shown in FIG. 7. In FIG. 7, the reflective optical element 911 includes a convex lens, which causes the image plane C to be concave toward the reflective optical element 911. Specifically, an image portion projected on a lower portion of the screen SC (portion closer to installed projector) is brought into focus, but an image portion brought into focus shifts forward away from the screen with distance upward from the lower portion because the image plane is curved.

A user who looks at the image projected on the screen SC can recognize a clear, focused image in the lower portion of the screen SC. However, the user recognizes a blurred image in an upper portion of the screen SC, and the degree of the blur increases with distance upward from the lower portion or with distance from the lower portion toward the periphery (corners in particular) of the screen SC. To avoid the phenomenon of what is called field curvature or to correct the projected image, the reflective optical element 911 in the projection lens 910 is designed, for example, to have an aspheric surface or a free-form surface.

Correcting the field curvature by designing the reflective optical element, for example, to have an aspheric surface or a free-form surface, however, requires changing the curvature of the surface of the reflective optical element in a complicated manner, undesirably resulting in complicated design and hence an increase in design burden. Further, since the surface shape is complicated, manufacture of the reflective optical element undesirably requires high-precision surface processing. Moreover, the reflective optical element undesirably tends to have a large aperture diameter (projection lens tends to have large outer shape).

It is therefore desired to provide a projector capable of lowering the degree of field curvature when a projection lens including a reflective optical element is attached to the projector.

SUMMARY

An advantage of some aspects of the invention is to solve at least a part of the problems described above, and the invention can be implemented in the form of the following aspects or application examples:

APPLICATION EXAMPLE 1

This application example is directed to a projector that modulates a light flux emitted from a light source in accordance with image information and projects the modulated light flux, the projector including (a) a projection lens that has a reflective optical element and reflects and projects the modulated light flux, (b) an optical unit formed of optical elements disposed downstream of the light source and upstream of the projection lens, (c) a support that supports the projection lens in an detachable manner with the optical unit, and (d) an angle adjuster that adjusts a setting angle of the projection lens.

According to the projector described above, the projection lens having a reflective optical element is supported by the support in an detachable manner with the optical unit. The angle adjuster can then be used to adjust the setting angle of the projection lens to lower the degree of field curvature. Further, for example, the projection lens can be interchanged with a projection lens having no reflective optical element, whereby the convenience for a user who uses the projector is improved.

APPLICATION EXAMPLE 2

In the projector according to the application example described above, it is preferable that the angle adjuster includes a first leg provided as part of the projection lens and a second leg provided as part of a body of the projector, and when the projection lens is supported by the support, the first leg and the second leg are used to determine the setting angle.

According to the projector described above, the angle adjuster that includes a first leg provided as part of the projection lens and a second leg provided as part of a body of the projector are used to adjust the setting angle of the projection lens including a reflective optical element. Adjusting the setting angle by using the angle adjuster allows a decrease in the degree of field curvature, which, for example, allows the reflective optical element to be so designed that the surface thereof has a suppressed amount of partial change in curvature, whereby the degree of design complication can be lowered. Further, for example, the aperture diameter of the reflective optical element can be reduced, whereby the size of the projection lens can be reduced.

The projection lens including the reflective optical element (hereinafter referred to as reflective projection lens) is larger than a projection lens including no reflective optical element (hereinafter referred to as typical projection lens) because the reflective projection lens includes the reflective optical element as an extra component. The weight of the reflective projection lens increases accordingly as compared with the typical projection lens. When the reflective projection lens is supported by the support and hence attached to an enclosure 10 of the projector, the center of gravity of the projector shifts toward the projection lens as compared with a case where the typical projection lens is supported by the support and hence attached to the enclosure. In this case, the first leg, which is provided as part of the reflective projection lens, can support the projector in a stable manner.

APPLICATION EXAMPLE 3

In the projector according to the application example described above, it is preferable that the angle adjuster adjusts the setting angle by inclining the optical unit and the projection lens supported by the support with respect to the body of the projector.

According to the projector described above, the angle adjuster adjusts the setting angle by inclining the optical unit and the projection lens to the body of the projector. Inclining the optical unit and the projection lens as an integrate unit to the body allows a decrease in the degree of field curvature but does not require any change in the angle of the body.

APPLICATION EXAMPLE 4

It is preferable that the projector according to the application example described above further includes a detection section that detects the type of an interchanged, currently attached projection lens, including the projection lens, a drive section that drives the angle adjuster, and a control section that issues an instruction to drive the drive section when the control section determines based on a detection result from the detection section that the projection lens is currently attached to the projector after interchange operation.

According to the projector described above, the detection section detects the type of an interchanged, currently attached projection lens. The control section then determines whether or not the reflective projection lens is currently attached after interchange operation based on a detection result from the detection section. When the control section determines that the reflective projection lens is currently attached, the control section drives the drive section. The drive section then drives the angle adjuster. The setting angle can therefore be efficiently adjusted without any manual operation of the angle adjuster.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments will be described below with reference to the drawings.

First Embodiment

Figure 1:
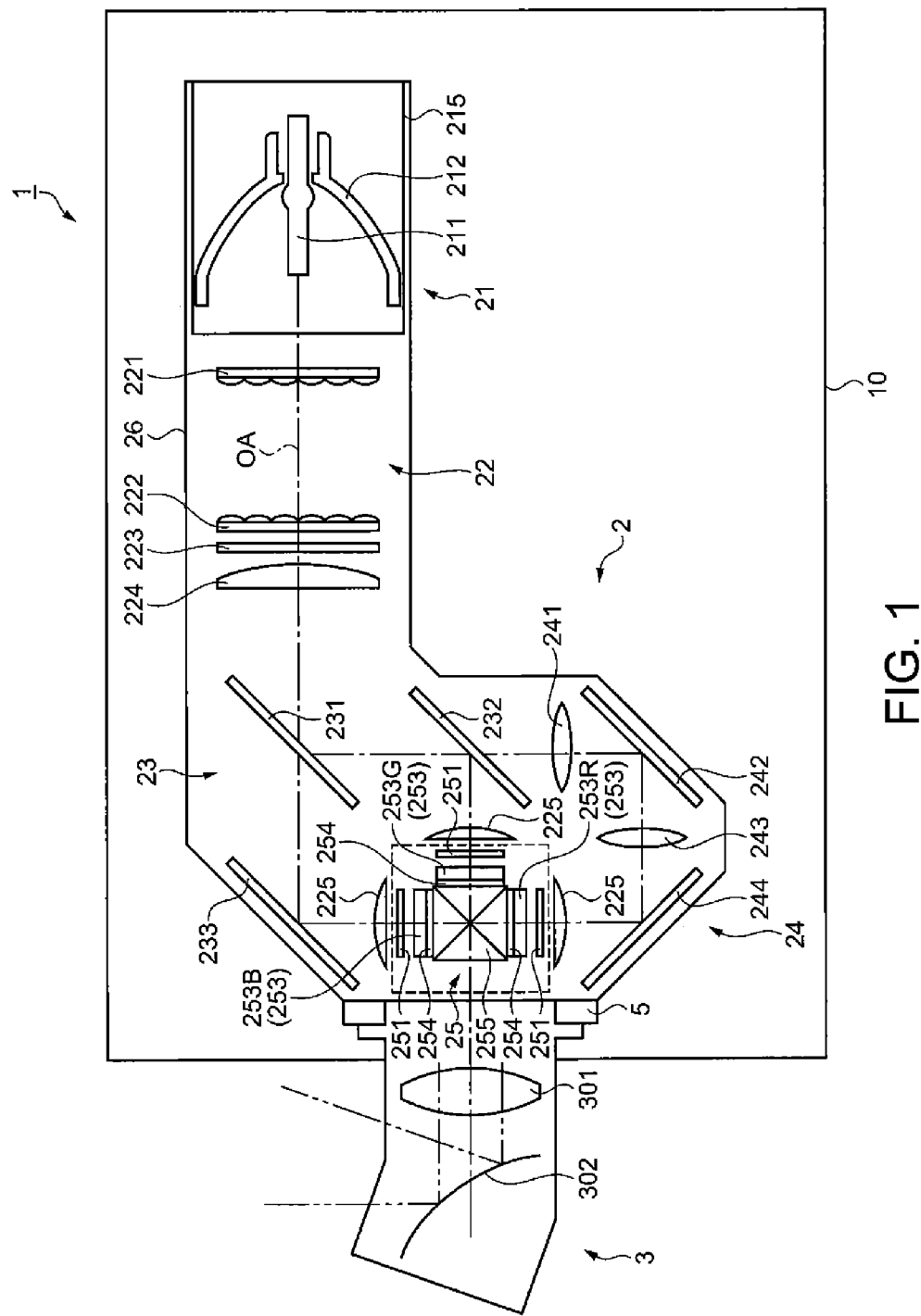
FIG. 1 is a diagrammatic view showing an optical system of a projector according to a first embodiment.

FIG. 1 is a diagrammatic view showing an optical system of a projector 1 according to the present embodiment. The configuration and action of the optical system of the projector 1 will be described with reference to FIG. 1.

The projector 1 according to the present embodiment is an apparatus that modulates a light flux outputted from a light source apparatus 21 in accordance with image information and enlarges and projects the modulated light flux on a screen SC (see FIG. 2) or any other projection surface. The projector 1 according to the present embodiment is covered with an exterior enclosure 10, which has a substantially box-like shape.

The optical system of the projector 1 includes an optical unit 2 and a reflective projection lens 3, which is connected to the optical unit 2, in the present embodiment, as shown in FIG. 1. The optical unit 2 is in other words formed of optical elements upstream of the reflective projection lens 3 in the optical system of the projector 1.

Further, the projector 1 according to the present embodiment allows the reflective projection lens 3 and a typical projection lens 4 (see FIG. 4) to be attached thereto in an interchangeable manner. The optical unit 2 is configured as a telecentric optical system, which can work both with the reflective projection lens 3 and the typical projection lens 4.

The optical unit 2 includes a light source apparatus 21, an illumination optical apparatus 22, a color separation optical apparatus 23, a relay optical apparatus 24, an electro-optical apparatus 25, and an optical enclosure 26, which accommodates the optical apparatus 21 to 25. The optical enclosure 26 is fixed to a support 5, which will be described later.

The light source apparatus 21 includes a discharge-type arc tube 211 and a reflector 212, which are accommodated in a light source enclosure 215. In the light source apparatus 21, a light flux emitted from the arc tube 211 is so reflected off the reflector 212 that the traveling directions of the reflected light fluxes are aligned with each other, and that the aligned light fluxes travel in parallel to an illumination optical axis OA to the illumination optical apparatus 22. The light source apparatus 21 in the present embodiment employs an ultra-high-pressure mercury lamp. The light source apparatus 21 is disposed in the optical enclosure 26 in an interchangeable manner.

The illumination optical apparatus 22 includes a first lens array 221, a second lens array 222, a polarization conversion element 223, a superimposing lens 224, and condenser lenses 225. The first lens array 221 divides the light flux outputted from the light source apparatus 21 into sub-light fluxes and outputs the sub-light fluxes along the illumination optical axis OA. The second lens array 222 receives the sub-light fluxes outputted from the first lens array 221 and outputs them toward the polarization conversion element 223.

The polarization conversion element 223 has a function of converting the sub-light fluxes having exited out of the second lens array 222, which are randomly polarized light fluxes, into one type of polarized sub-light fluxes having polarization directions substantially aligned to each other, which can be used by liquid crystal panels 253, which will be described later. The superimposing lens 224 substantially superimposes the converted sub-light fluxes, which form one type of polarized sub-light fluxes, from the polarization conversion element 223 on the surface of each of the liquid crystal panels 253.

The color separation optical apparatus 23 includes a first dichroic mirror 231, a second dichroic mirror 232, and a reflection mirror 233. The color separation optical apparatus 23 separates the light fluxes having exited out of the illumination optical apparatus 22 in terms of color into the following three types of color light: red (R) light, green (G) light, and blue (B) light.

The relay optical apparatus 24 includes a light-incident-side lens 241, a relay lens 243, and reflection mirrors 242 and 244. The relay optical apparatus 24 guides the separated R light from the color separation optical apparatus 23 to a liquid crystal panel 253R for R light. The relay optical apparatus 24 guides the R light in the present embodiment, but the relay optical apparatus 24 does not necessarily guide the R light and may instead guide, for example, the B light.

The electro-optical apparatus 25 includes three light-incident-side polarizers 251, three liquid crystal panels 253 (liquid crystal panel 253R for R light, liquid crystal panel 253G for G light, and liquid crystal panel 253B for B light) as transmissive light modulators, three light-exiting-side polarizers 254, and a cross dichroic prism 255.

The liquid crystal panels 253 (253R, 253G, and 253B) modulate the separated color light fluxes from the color separation optical apparatus 23 in accordance with image information. The cross dichroic prism 255 is formed by bonding four rectangular prisms to each other and hence has a substantially square shape in a plan view, and two dielectric multilayer films are formed on the interfaces between the bonded rectangular prisms. The cross dichroic prism 255 combines the modulated color light fluxes from the liquid crystal panels 253R, 253G, and 253B with one another and outputs the combined light flux to the reflective projection lens 3.

The reflective projection lens 3 is formed of the following components: a combined lens that is a combination of the plurality of lenses 301; and a reflective lens 302, which serves as a reflective optical element disposed in the last stage of the reflective projection lens 3 and having a substantially convex shape. The reflective projection lens 3 causes the modulated, combined light flux from the electro-optical apparatus 25 to pass through the lenses 301, to be reflected off the reflective lens 302 in the last stage, and to be enlarged and projected on the screen SC or any other projection surface.

The typical projection lens 4 (see FIG. 4) has no reflective lens and is formed of a combined lens that is a combination of a plurality of lenses 401. The typical projection lens 4 enlarges and projects the modulated, combined light flux from the electro-optical apparatus 25 via the lenses 401 on the screen SC or any other projection surface.

The reflective projection lens 3 and the typical projection lens 4 are supported by the support 5 in a detachable, interchangeable manner. Specifically, the support 5 allows the reflective projection lens 3 to be connected to the optical unit 2 and the optical position relationship therebetween to be held. Similarly, the support 5 allows the typical projection lens 4 to be connected to the optical unit 2 and the optical position relationship therebetween to be held.

Figure 2:
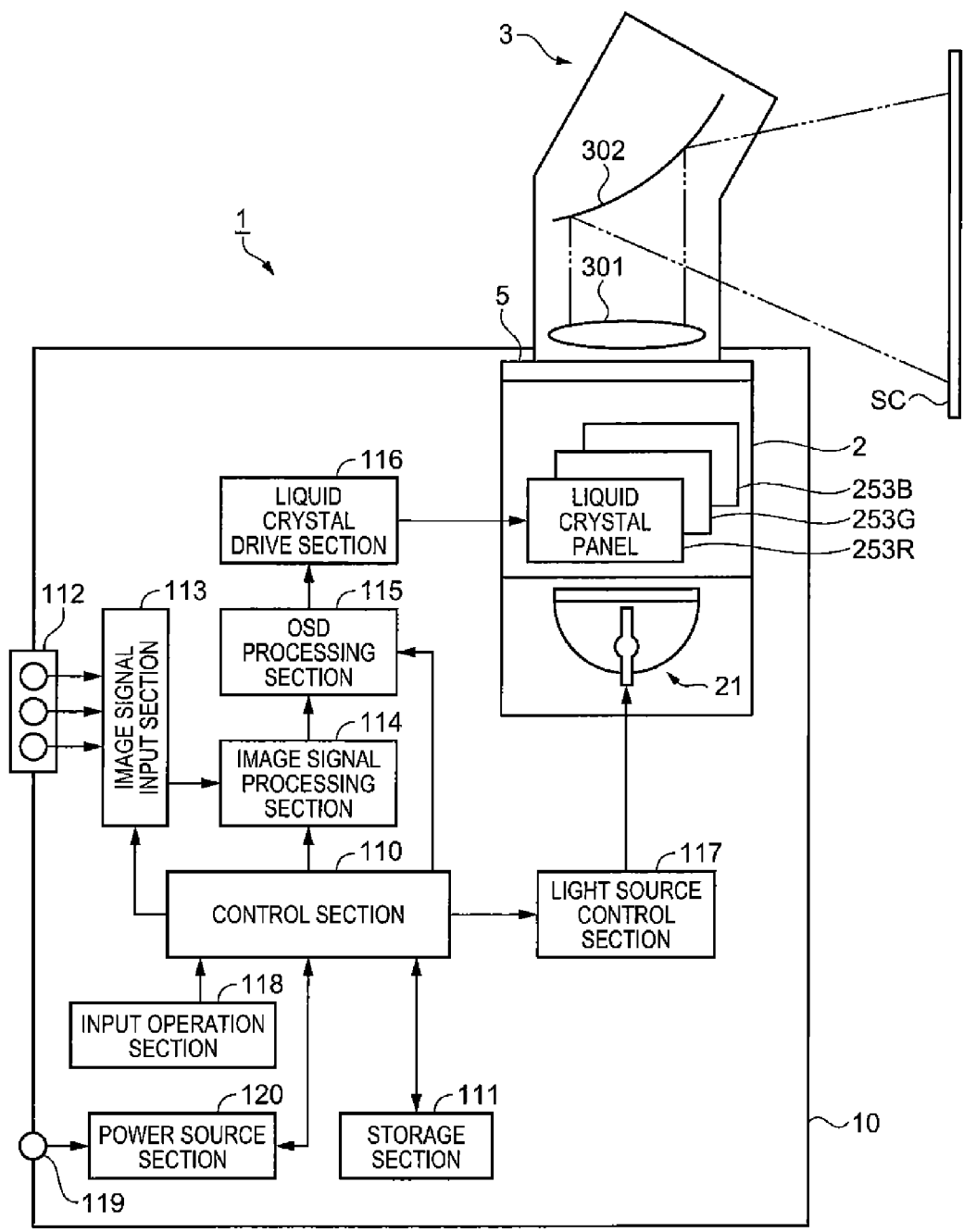
FIG. 2 is a block diagram showing the circuit configuration of the projector.

FIG. 2 is a block diagram showing the circuit configuration of the projector 1. The circuit configuration and action of the projector 1 will be described with reference to FIG. 2. FIG. 2 also shows the optical system described above in a simplified manner.

The projector 1 according to the present embodiment is formed, for example, of a control section 110, a storage section 111, an image input terminal 112, an image signal input section 113, an image signal processing section 114, an OSD processing section 115, a liquid crystal drive section 116, a light source control section 117, an input operation section 118, a power source terminal 119, and a power source section 120. The constituent sections described above are accommodated in the exterior enclosure 10 or disposed on the outer surface thereof.

The image signal input section 113 receives image information as an input from an external image output apparatus, such as a video reproduction apparatus and a personal computer, via a cable (not shown) or any other component through the image input terminal 112. The inputted image information is outputted to the image signal processing section 114 in response to an instruction from the control section 110. The image signal input section 113 may instead include a receiver based, for example, on wireless communication or optical communication and receive an image signal as an input wirelessly from the external apparatus.

The image signal processing section 114 converts the image information inputted from the image signal input section 113 into image information representing the grayscale at each pixel in each of the liquid crystal panels 253R, 253G, and 253B in response to an instruction from the control section 110. The converted image information is formed of portions corresponding to the three colors, and each of the portions is formed of a plurality of pixel values corresponding to all pixels in the corresponding one of the liquid crystal panels 253R, 253G, and 253B. Each of the pixel values specifies optical transmittance at the corresponding pixel and defines the intensity (grayscale) of light that passes through the pixel and exits out thereof.

The OSD processing section 115 carries out a process of superimposing a menu image, a message image, or any other OSD (on-screen display) image on the image information inputted from the image signal processing section 114 and displaying the superimposed image in response to an instruction from the control section 110. When the control section 110 issues no instruction to superimpose an OSD image, the OSD processing section 115 outputs the image information inputted from the image signal processing section 114 directly to the liquid crystal drive section 116.

The liquid crystal drive section 116 drives the liquid crystal panels 253R, 253C, and 253B in accordance with the image information inputted from the OSD processing section 115. The driven liquid crystal panels 253R, 253G, and 253B form images according to the image information, and the images are projected via the reflective projection lens 3.

The control section 110 includes a CPU (central processing unit) and a RAM (random access memory) used to temporarily store a variety of data and other pieces of information. The control section 110 operates in accordance with a control program (not shown) stored in the storage section 111 to oversee and control the action of the projector 1. The control section 110 along with the storage section 111 functions as a computer.

The storage section 111 is formed of a flash memory, an FeRAM, or any other rewritable nonvolatile memory. The storage section 111 stores, for example, the control program for controlling the action of the projector 1 and a variety of setting data that define, for example, action conditions under which the projector 1 operates.

The light source control section 117 controls supply and termination of electric power supplied to the light source apparatus 21 to turn on and off the light source apparatus 21 in response to an instruction from the control section 110.

The input operation section 118 includes a plurality of operation keys (not shown) that allow a user to issue a variety of instructions to the projector 1. The input operation section 118 is disposed on the outer surface of the exterior enclosure 10 of the projection 1.

The power source section 120 receives electric power, such as AC 100 V, externally supplied through the power source terminal 119. The power source section 120 converts, for example, commercial electric power (AC electric power) into DC electric power having a predetermined voltage and supplies the constituent sections of the projector 1 with the converted electric power.

Figure 3A:
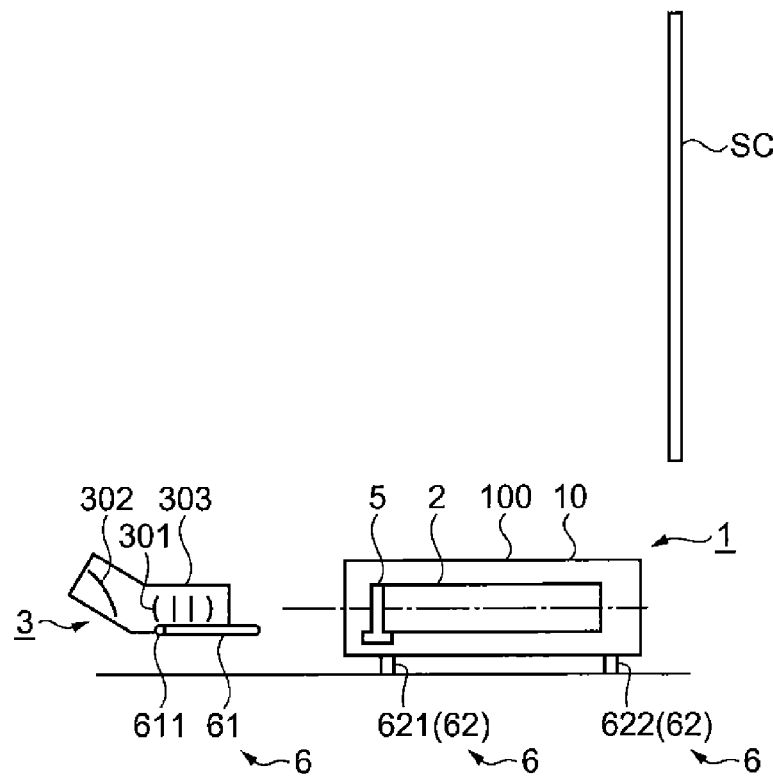
FIGS. 3A and 3B are diagrammatic views showing states in which the projector to which a reflective projection lens is attached is used to project an image on a screen.
Figure 3B:
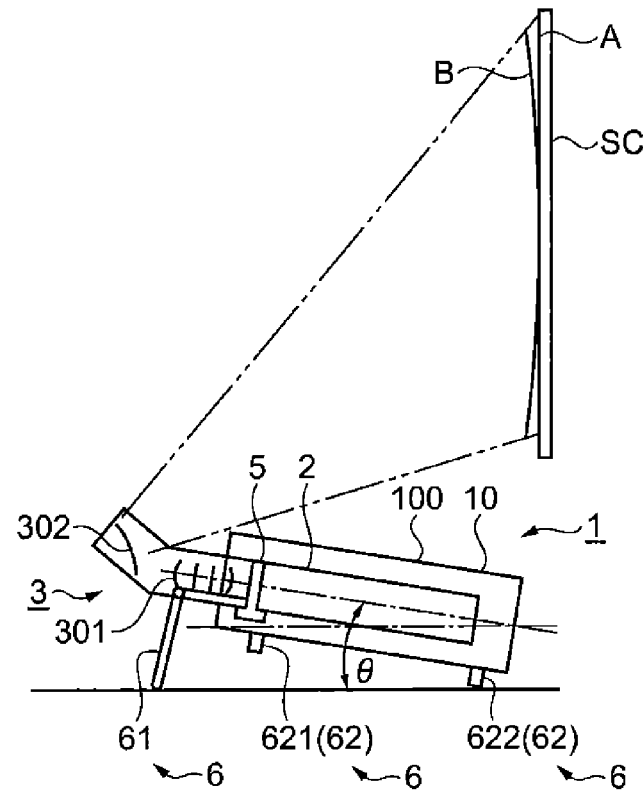

FIGS. 3A and 3B are diagrammatic views showing states in which the projector 1 to which the reflective projection lens 3 is attached is used to project an image on the screen SC. FIG. 3A shows a state before the reflective projection lens 3 is attached to a body 100 of the projector 1, and FIG. 3B shows a state in which the reflective projection lens 3 has been attached to the body 100 of the projector 1 and an image is projected from the projector 1. In FIGS. 3A and 3B, the optical unit 2 in the exterior enclosure 10, the reflective projection lens 3, and the support 5 are diagrammatically shown in solid lines. The configuration and action of an angle adjuster 6 in the present embodiment will be described with reference to FIGS. 3A and 3B.

The reflective projection lens 3 is provided with a first leg 61, as shown in FIG. 3A. When the reflective projection lens 3 is detached and stored, the first leg 61 is so folded that it extends along the outer surface of a lens enclosure 303.

The reflective projection lens 3 is specifically supported by and fixed to the support 5, as shown in FIG. 3B. In the present embodiment, the reflective projection lens 3 is fixed to the support 5 with screws. The optical unit 2 is also supported by and fixed to the support 5. The reflective projection lens 3 and the optical unit 2 are therefore supported by and fixed to the support 5. The support 5 is fixed to the exterior enclosure 10. The reflective projection lens 3 and the optical unit 2 are therefore fixed to the exterior enclosure 10 via the support 5.

When the reflective projection lens 3 is fixed to the support 5, the first leg 61 is rotated around a support shaft 611 to a predetermined position. The structure of the first leg 61 allows the first leg 61 to rotate, elastically deform a protrusion (not show) provided on the lens enclosure 303, climb over the deformed protrusion, and move to the predetermined position, where the first leg 61 is fixed to the lens enclosure 303, as shown in FIG. 3B.

The body 100 of the projector 1 is provided with a second leg 62. Specifically, the second leg 62 is disposed on the bottom surface of the exterior enclosure 10. The second leg 62 includes a front leg 621, which is disposed in a position on the side to which the reflective projection lens 3 is attached and at the center of the bottom surface when viewed in the longitudinal direction of the reflective projection lens 3. The second leg 62 further includes a rear leg 622 on the opposite side to the side to which the reflective projection lens 3 is attached and on both the right and left sides when viewed in the longitudinal direction of the reflective projection lens 3 (two rear legs in total).

In the present embodiment, the front leg 621 is expandable and retractable. The front leg 621 is, however, not used when the reflective projection lens 3 is used.

As described above, when the reflective projection lens 3 is fixed to the support 5, the projector 1 is supported by the first leg 61 and the rear leg 622, which forms the second leg 62, as shown in FIG. 3B. A setting angle θ of the reflective projection lens 3 is thus adjusted.

The length of the first leg 61 is so set that the setting angle θ of the reflective projection lens 3 is greater than the setting angle θ in a case where the front leg 621 is used with the length thereof maximized.

With the setting angle θ of the reflective projection lens 3 adjusted, the light having exited out of the projection lens is projected to form a projected image that does not coincide with a flat surface A of the screen SC but is brought into focus along an image plane B (projected image with field curvature), as shown in FIG. 3B. The image plane B is concave toward the convex reflective lens 302.

Figure 7:
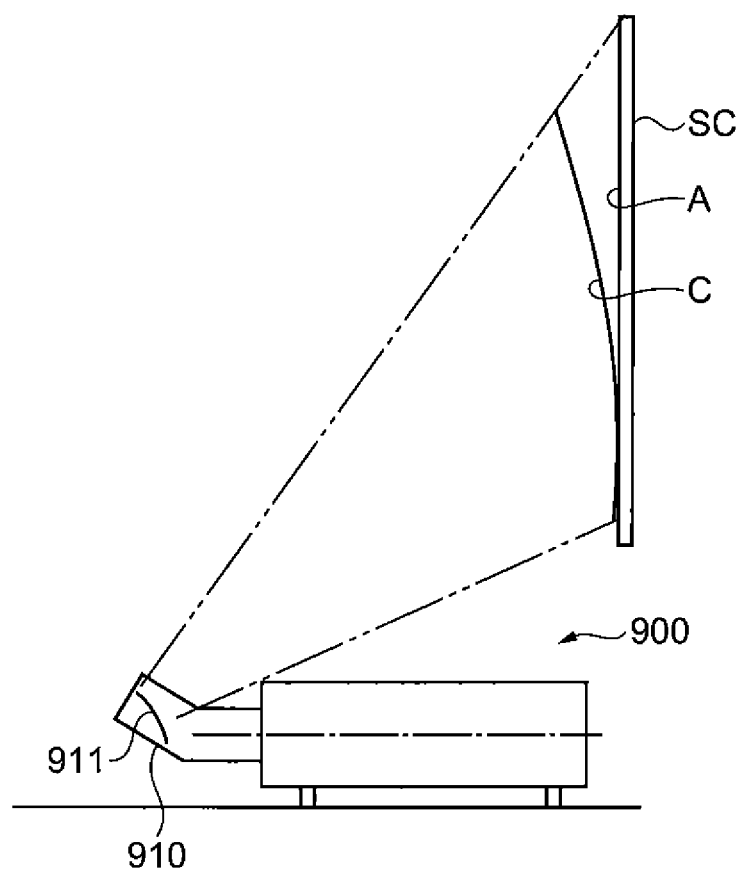
FIG. 7 is a diagrammatic view showing a state in which a projector to which a reflective projection lens of related art is attached is used to project an image on a screen.

An image projected by the projector 900 having the configuration of related art does not coincide with the surface A of the screen SC but is brought into focus along the image plane C (projected image with field curvature), as shown in FIG. 7. In the image projected on the surface A in related art, an image portion projected on a lower portion of the screen SC (portion closer to installed projector) is brought into focus, but an image portion brought into focus shifts forward away from the screen with distance upward from the lower portion because the image plane is curved.

In contrast, in the projected image on the surface A in the present embodiment, a central portion of the screen SC shows a focused image portion, but an image portion brought into focus shifts forward away from the screen with distance from the central portion upward, downward, rightward, and leftward because the image plane is curved, as shown in FIG. 3B. In the present embodiment, however, the degree of field curvature can be smaller than that in related art because the setting angle θ of the reflective projection lens 3 is adjusted to be greater than that in related art so that the reflective lens 302 more directly faces the screen SC.

Although the projected image on the surface A is in an exact sense gradually blurred with distance from the center of the surface A upward, downward, rightward, and leftward or with distance from the center to the corners of the screen SC as described above, the degree of the blur can be greatly lowered (improved) as compared with the degree of the blur in related art, whereby the projected image is unlikely to cause the user to recognize the blur. The projector 1 according to the present embodiment can therefore project an image that is unlikely to cause the user to be aware of field curvature on the surface A.

Figure 4:
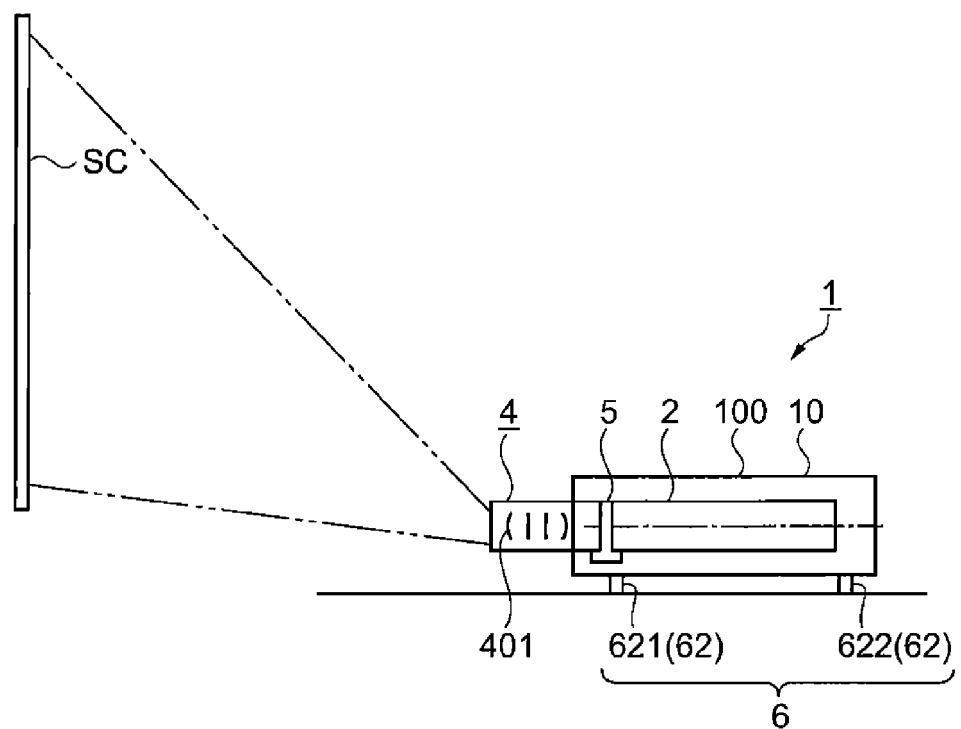
FIG. 4 is a diagrammatic view showing a state in which the projector to which a typical projection lens is attached is used to project an image on the screen.

FIG. 4 is a diagrammatic view showing a state in which the projector 1 to which the typical projection lens 4 is attached is used to project an image on the screen SC. In FIG. 4, the optical unit 2 in the exterior enclosure 10, the typical projection lens 4, and the support 5 are diagrammatically shown in solid lines.

The support 5 can support the reflective projection lens 3 and the typical projection lens 4 having no reflective lens 302 in an interchangeable manner. The projector 1 can therefore perform projection through the typical projection lens 4 attached to the support 5, as shown in FIG. 4. In this case, increasing or decreasing the length of the first leg 621, which forms the second leg 62, allows the projector 1 to be inclined for image projection.

The embodiment described above provides the following advantageous effects.

The projector 1 according to the present embodiment includes the reflective projection lens 3, the optical unit 2, the support 5, which supports the reflective projection lens 3 in an detachable manner with the optical unit 2, and the angle adjuster 6, which adjusts the setting angle θ of the reflective projection lens 3. The angle adjuster 6 includes the first leg 61, which is provided as part of the reflective projection lens 3, and the second leg 62 (rear leg 622), which is provided as part of the body 100 of the projector 1. The angle adjuster 6 can adjust the setting angle θ of the reflective projection lens 3 to lower the degree of field curvature. The projector 1 can thus project an image that is unlikely to cause the user to be aware of field curvature on the flat surface (surface A) of the screen SC or any other surface.

The projector 1 according to the present embodiment, which can lower the degree of field curvature, for example, allows the reflective lens 302 to be so designed that the surface thereof has a suppressed amount of partial change in curvature, whereby the degree of design complication can be lowered. Further, the fact that the lens design can be made to suppress the amount of partial change in curvature allows reduction in the area that requires precise surface processing in the manufacture of the reflective lens 302. Moreover, for example, the aperture diameter of the reflective lens 302 can be reduced, whereby the size of the reflective projection lens 3 can be reduced.

The projector 1 according to the present embodiment allows both the reflective projection lens 3 and the typical projection lens 4 to be used because the support 5 supports the reflective projection lens 3 and the typical projection lens 4 in an interchangeable manner, whereby the convenience for the user who uses the projector 1 can be improved.

The reflective projection lens 3 in the present embodiment is larger than the typical projection lens 4 because the reflective projection lens 3 includes the reflective lens 302 as an extra component. The weight of the reflective projection lens 3 increases accordingly as compared with the typical projection lens 4. When the reflective projection lens 3 is supported by the support 5 and hence attached to the exterior enclosure 10 of the projector 1, the center of gravity of the projector 1 shifts toward the projection lens as compared with the case where the typical projection lens 4 is supported by the support 5 and hence attached to the exterior enclosure 10. In this case, the first leg 61, which is provided as part of the reflective projection lens 3, can support the projector 1 in a stable manner.

Second Embodiment

Figure 5:
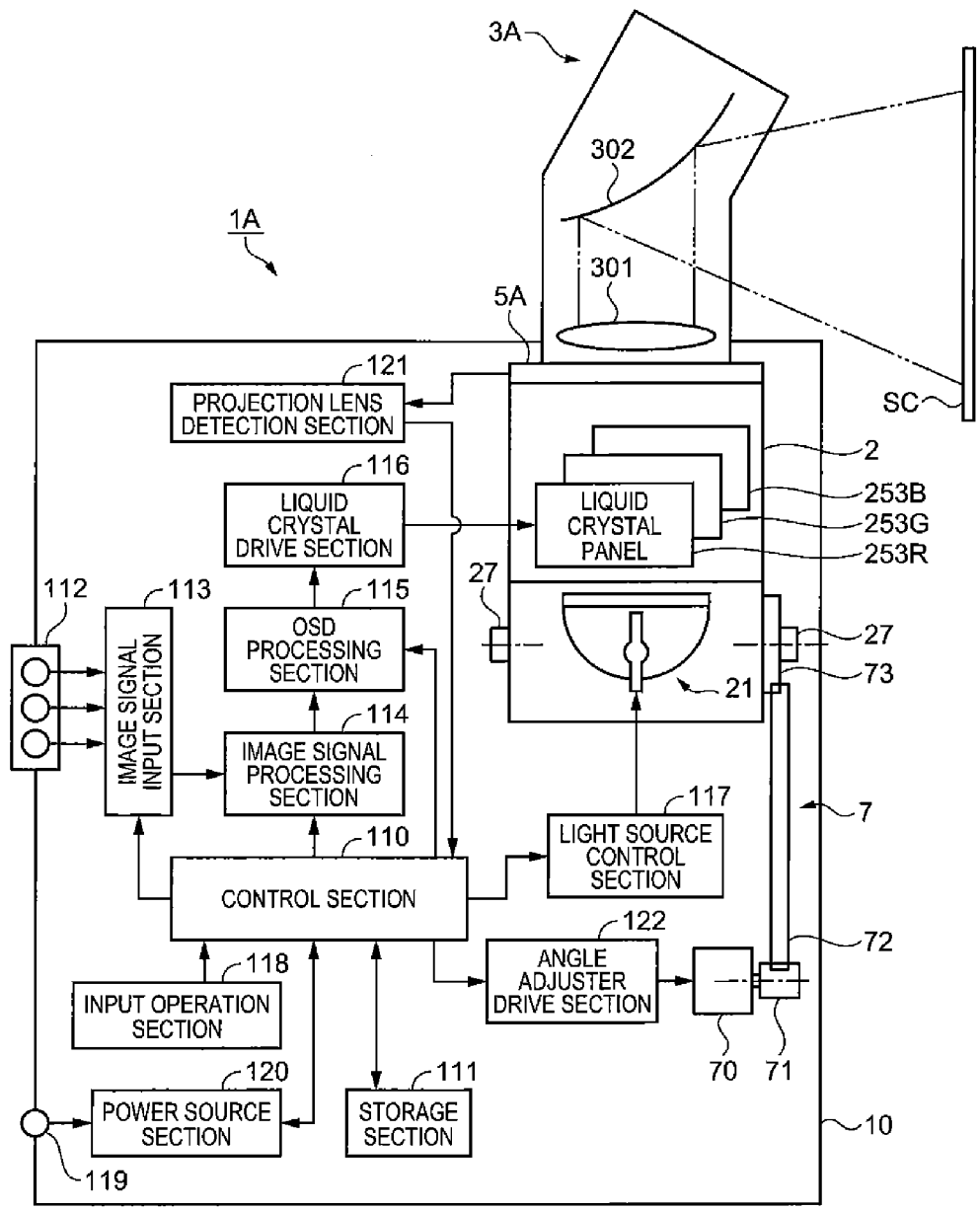
FIG. 5 is a block diagram showing the circuit configuration of a projector according to a second embodiment.

FIG. 5 is a block diagram showing the circuit configuration of a projector 1A according to the present embodiment. The circuit configuration and action of the projector 1A will be described with reference to FIG. 5.

The circuit configuration of the projector 1A according to the present embodiment is substantially the same as the circuit configuration of the projector 1 according to the first embodiment but differs therefrom in that a projection lens detection section 121 and an angle adjuster drive section 122 are added and an angle adjuster 7 is newly provided. The angle adjuster 7 is formed of a motor 70, a pinion 71, a transmission gear group 72, and a final gear 73, which will be described later. The configuration of the optical system of the projector 1A is the same as the configuration of the optical system of the projector 1 according to the first embodiment. In the following sections, the constituent sections different from those in the first embodiment will be described, and the same constituent sections will not be described.

The projection lens detection section 121 as a detection section detects the type of an interchanged, currently attached projection lens, including a reflective projection lens 3A among others. The projection lens detection section 121 is formed of a microswitch (not shown) disposed on a support 5A in the present embodiment. The microswitch detects presence or absence of pressure applied thereto (ON/OFF of switch) to detect the presence or absence of a hole provided in a predetermined position of a projection lens and representing the type of the projection lens. The projection lens detection section 121 may be configured to operate based on another detection method.

The control section 110 determines the type of an attached projection lens based on a signal detected by the projection lens detection section 121. When the control section 110 determines that the reflective projection lens 3A has been attached, the control section 110 instructs the angle adjuster drive section 122 to perform the angle adjustment. The angle adjuster drive section 122 as a drive section supplies electric power required to drive the angle adjuster 7 in response to the instruction from the control section 110.

Figure 6A:
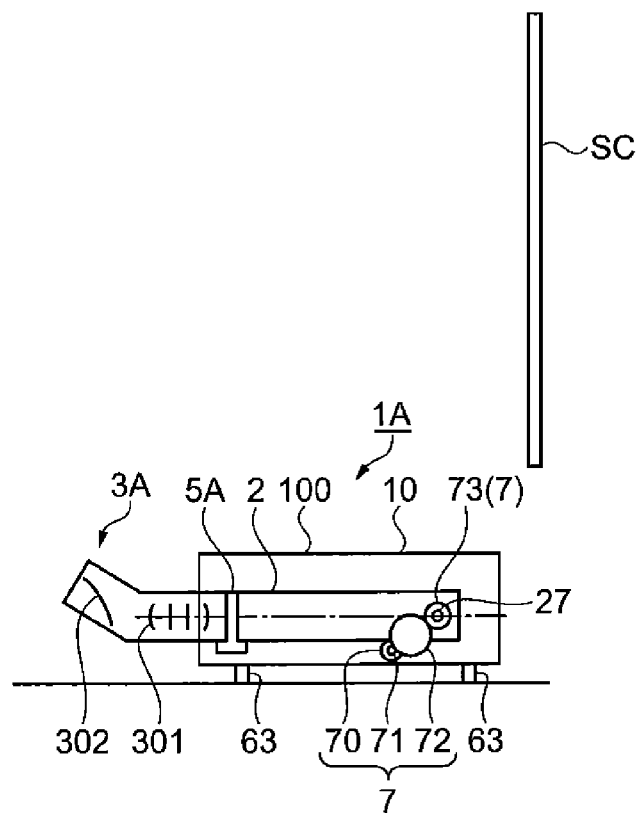
FIGS. 6A and 6B are diagrammatic views showing states in which the projector to which a reflective projection lens is attached is used to project an image on the screen.
Figure 6B:
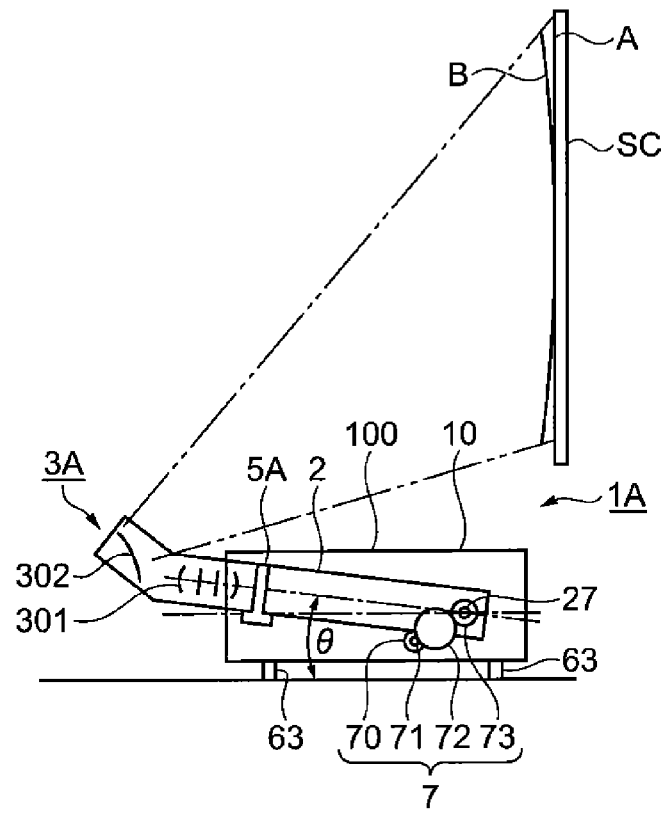

FIGS. 6A and 6B are diagrammatic views showing states in which the projector 1A to which the reflective projection lens 3A is attached is used to project an image on the screen SC. FIG. 6A shows a state after the reflective projection lens 3A is attached to the body 100 of the projector 1A, and FIG. 6B shows a state in which the angle of the reflective projection lens 3A attached to the projector 1A has been adjusted and an image is projected from the projector 1A. In FIGS. 6A and 6B, the optical unit 2 in the exterior enclosure 10, the reflective projection lens 3A, and a support 5A are diagrammatically shown in solid lines. The configuration and action of the angle adjuster 7 in the present embodiment will be described with reference to FIGS. 5, 6A, and 6B.

In the projector 1 according to the first embodiment, the angle adjuster 6 (first leg 61 and second leg 62) is used to adjust the angle of the reflective projection lens 3. The angle adjustment also causes inclination of the body 10. In contrast, in the projector 1A according to the present embodiment, the angle adjuster 7 does not change the angle of the body 100 but adjusts the angle of the reflective projection lens 3A, the support 5A, and the optical unit 2 . In other words, in the projector 1A according to the present embodiment, the reflective projection lens 3A, the support 5A, and the optical unit 2 are inclined to the body 100 for the adjustment of the setting angle θ.

The support 5A in the present embodiment supports and fixes not only the optical unit 2 but also the reflective projection lens 3A. As a result, with the support 5A considered as a reference, the reflective projection lens 3A and the optical unit 2 along with the support 5A form an integrated unit. The present embodiment differs from the first embodiment in that the support 5A is not fixed to the exterior enclosure 10. Further, the reflective projection lens 3A differs from the reflective projection lens 3 in the first embodiment in that no first leg 61 is provided.

The body 100 of the projector 1A is provided with legs 63. Specifically, the legs 63 are disposed on the bottom surface of the exterior enclosure 10. One of the legs 63 is disposed in a position on the side to which the reflective projection lens 3A is attached and at the center of the bottom surface when viewed in the longitudinal direction of the reflective projection lens 3A. The remaining legs 63 are disposed on the opposite side to the side to which the reflective projection lens 3A is attached and on the right and left sides when viewed in the longitudinal direction (two legs in total). The leg 63 at the center is configured to be expandable and retractable and used when the typical projection lens 4 is attached in place of the reflective projection lens 3A.

The optical enclosure 26, which encloses the optical unit 2, has a rotating shaft 27 provided on both sides of the optical enclosure 26 in the vicinity of the portion where the light source apparatus 21 is disposed, and the rotating shafts 27 rotatably supports the optical unit 2. Bearings (not shown) that receive the rotating shafts 27 are so formed that the bearings protrude from the exterior enclosure 10.

The integrated reflective projection lens 3A, support 5A, and optical unit 2 are therefore rotatable around the rotating shafts 27. The setting angle θ of the reflective projection lens 3A can thus be adjusted.

The angle adjuster 7 in the present embodiment is formed of a motor 70, a pinion 71, a transmission gear group 72, and a final gear 73, as shown in FIGS. 5, 6A, and 6B. The transmission gear group 72, which is formed of a plurality of gears, reduces the speed of rotation transmitted from the pinion 71 and transmits the reduced rotation to the final gear 73. The final gear 73 is disposed in the optical enclosure 26 and around one of the rotating shafts 27 disposed in the optical enclosure 26.

When the control section 110 determines that the reflective projection lens 3A has been attached based on a signal detected by the projection lens detection section 121, the control section 110 instructs the angle adjuster drive section 122 to perform the angle adjustment, as described above. The angle adjuster drive section 122 supplies electric power required to drive the angle adjuster 7 (motor 70) for a predetermined period in response to the instruction from the control section 110.

The action of the angle adjuster 7 will be described.

First, from the state shown in FIG. 6A, the motor 70 is driven to rotate the pinion 71, which is attached to the rotating shaft of the motor 70. The transmission gear group 72, which engages with the pinion 71, is then rotated. When a plurality of gears in the transmission gear group 72 rotate, the rotation transmitted from the pinion 71 is converted into rotation having an appropriate reduced rotation speed, and the resultant rotation is transmitted to the final gear 73.

The thus transmitted rotation allows the optical unit 2 to rotate around the rotating shafts 27 in accordance with the rotation of the final gear 73. The rotation of the optical unit 2 rotates the reflective projection lens 3A, which is connected to the optical unit 2. The series of action of the angle adjuster 7 allows adjustment of the setting angle θ of the reflective projection lens 3A, as shown in FIG. 6B.

The projector 1A thus having undergone the adjustment of the angle of the reflective projection lens 3A projects the same image in the first embodiment on the surface A of the screen SC, and no description of the image will therefore be made.

The projector 1A according to the present embodiment, to which the reflective projection lens 3A and the typical projection lens 4 can be attached in an interchangeable manner as in the first embodiment, allows the typical projection lens 4 to be fixed to the support 5A for use in place of the reflective projection lens 3A.

The embodiment described above provides the following advantageous effects.

In the projector 1A according to the present embodiment, the angle adjuster 7 inclines the optical unit 2 and the reflective projection lens 3A to the body 100 of the projector 1A to adjust the setting angle θ. Inclining the integrated optical unit 2 and reflective projection lens 3A to the body 100 as described above allows image projection with the degree of field curvature lowered but does not require any change in the angle of the body 100.

In the projector 1A according to the present embodiment, the projection lens detection section 121 detects the type of the interchanged, currently attached projection lens. The control section 110 then determines whether or not the reflective projection lens 3A has been attached based on a signal detected by the projection lens detection section 121. When the control section 110 determines that the reflective projection lens 3A has been attached, the control section 110 issues an instruction to drive the angle adjuster drive section 122.

The angle adjuster drive section 122 drives the angle adjuster 7 in response to the instruction from the control section 110. The setting angle θ can therefore be efficiently adjusted without any manual operation of the angle adjuster.

The invention is not limited to the embodiments described above, and a variety of changes, improvements, and modifications can be made thereto to the extent that they do not depart from the substance of the invention. Variations follow.

The projector 1A according to the second embodiment described above is so configured that the projection lens detection section 121, the angle adjuster drive section 122, and the angle adjuster 7 are used to electrically perform the angle adjustment. However, the configuration described above is not necessarily employed, and the rotating shafts 27 may instead be manually rotated. In this case, a metal member, a synthetic resin member, or any other suitable member may be used to place a load on the rotating shafts 27, which are manually rotated against the load, and the rotating shafts 27 after the rotation are held under the load.

The projector 1A according to the second embodiment described above is so configured that the angle adjuster drive section 122 drives the motor 70 for a predetermined period. Instead, a detection section that detects whether or not the reflective projection lens 3A has rotated to a predetermined angular position may be provided, and the reflective projection lens 3A may be so controlled that it makes appropriate angular rotation (corresponding to setting angle θ).

The projectors 1 and 1A according to the first and second embodiments described above use a transmissive light modulator as each of the light modulators. Each of the light modulators is not limited thereto and can be a reflective light modulator, a micromirror-based light modulator, or a light modulator based on another method. The micromirror-based light modulator can, for example, be a DMD (digital micromirror device).

The projectors 1 and 1A according to the first and second embodiments described above use a discharge-type light source in the light source apparatus 21. The light source apparatus may instead use a solid-state light source. The solid-state light source may be a laser light source, an LED (light emitting diode), an organic EL (electro-luminescence) device, a silicon-based light emitting device, or any of a variety of other solid-state light emitting devices.

The entire disclosure of Japanese Patent Application No. 2013-149173, filed Jul. 18, 2013 is expressly incorporated by reference herein.

What is claimed is:

1. A projector that modulates a light flux emitted from a light source in accordance with image information and projects the modulated light flux, the projector comprising:
   a projection lens that has a reflective optical element and reflects and projects the modulated light flux;
   an optical unit formed of optical elements disposed downstream of the light source and upstream of the projection lens;
   a support that supports the projection lens in an detachable manner with the optical unit; and
   an angle adjuster that adjusts a setting angle of the projection lens, wherein the angle adjuster includes
      a first leg provided as part of the projection lens, and
      a second leg provided as part of a body of the projector, and
      when the projection lens is supported by the support, the first leg and the second leg are used to determine the setting angle.

2. The projector according to claim 1,
   wherein the reflective optical element has a convex shape.

3. A projector that modulates a light flux emitted from a light source in accordance with image information and projects the modulated light flux, the projector comprising:
- a projection lens that has a reflective optical element and reflects and projects the modulated light flux;
- an optical unit formed of optical elements disposed downstream of the light source and upstream of the projection lens;
- a support that supports the projection lens in an detachable manner with the optical unit;
- an angle adjuster that adjusts a setting angle of the projection lens, wherein the angle adjuster adjusts the setting angle by inclining the optical unit and the projection lens supported by the support with respect to a body of the projector;
- a detection section that detects the type of currently attached projection lens among interchangeable projection lenses that including the projection lens;
- a drive section that drives the angle adjuster; and
- a control section that issues an instruction to drive the drive section when the control section determines based on a detection result from the detection section that the projection lens is currently attached to the projector after interchange operation.

4. The projector according to claim 3, wherein the reflective optical element has a convex shape.

* * * * *